(12) United States Patent
Song

(10) Patent No.: US 8,242,388 B2
(45) Date of Patent: Aug. 14, 2012

(54) SCALE

(75) Inventor: Jin-Jin Song, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 197 days.

(21) Appl. No.: 12/750,886

(22) Filed: Mar. 31, 2010

(65) Prior Publication Data

US 2011/0132107 A1    Jun. 9, 2011

(30) Foreign Application Priority Data

Dec. 8, 2009  (CN) .......................... 2009 1 0311052

(51) Int. Cl.
*G01G 23/06*     (2006.01)
*G01L 1/00*      (2006.01)
*G01L 1/22*      (2006.01)

(52) U.S. Cl. ........ 177/187; 177/189; 177/184; 177/185; 177/186; 73/862.626; 73/862.633; 73/862.638

(58) Field of Classification Search ............. 73/862.624, 73/862.626, 862.636, 862.629, 862.631, 73/862.634, 862.637, 862.639, 862.633, 73/862.638, 862.627; 177/184, 185, 186, 177/187, 189

See application file for complete search history.

(56) References Cited

U.S. PATENT DOCUMENTS

| | | | | |
|---|---|---|---|---|
| 2,742,278 A * | 4/1956 | Carleton, Jr. | ................... | 177/189 |
| 4,438,823 A * | 3/1984 | Hussels et al. | ......... | 177/210 EM |
| 5,096,007 A * | 3/1992 | Burkhard | ...................... | 177/187 |
| 5,714,694 A * | 2/1998 | Diessner | .................. | 73/862.632 |
| 5,721,398 A * | 2/1998 | Balsen et al. | .................. | 177/184 |
| 5,777,240 A * | 7/1998 | Lefebvre et al. | ......... | 73/862.634 |
| 7,317,167 B2 * | 1/2008 | Burkhard et al. | ............. | 177/184 |
| 2002/0194922 A1 * | 12/2002 | Schaefer et al. | ................ | 73/720 |

* cited by examiner

*Primary Examiner* — Lisa Caputo
*Assistant Examiner* — Jonathan Dunlap
(74) *Attorney, Agent, or Firm* — Altis Law Group, Inc.

(57) ABSTRACT

A scale includes a stationary bracket, a movable bracket, a linear displacement sensor and a plurality of the resilient mechanisms. The movable bracket is disposed opposite to the stationary bracket. The linear displacement sensor is disposed between the stationary bracket and the movable bracket. The resilient mechanisms are disposed between the stationary bracket and the movable bracket. Each resilient mechanism includes a limiting shaft, a sleeve movably sleeved on the limiting shaft and a resilient member received in the sleeve. The limiting shaft is fixed to one of the stationary bracket or the movable bracket, and the sleeve is fixed to the other. The resilient member is elastically deformed by resisting a free end of the limiting shaft. The linear displacement sensor registers a displacement of the movable bracket.

14 Claims, 6 Drawing Sheets

SCALE

BACKGROUND

1. Technical Field

The present disclosure relates to scales, and particularly, to a scale having a linear displacement sensor.

2. Description of the Related Art

Many scales are marketing common everyday use, for example, electronic scales utilizing pressure sensors, capacitive sensor, and others.

A typical scale includes a stationary bracket, a movable bracket, a capacitive sensor, a plurality of springs, an integrated circuit processor and a display. The stationary bracket and the movable bracket are fixedly connected via the springs. The capacitive sensor includes a grid electrode, an emitting electrode and a receiving electrode. The grid electrode is fixed to the movable bracket. The emitting electrode and the receiving electrode are fixed to the stationary bracket. The integrated circuit processor and the display are electrically connected to the receiving electrode. When an object to be weighed is centered on the movable bracket, compression deformation of each spring equals a displacement ΔS between the emitting electrode and the grid electrode. The receiving electrode receives a signal of the displacement ΔS. The integrated circuit processor processes the signal and sends corresponding weight information to the display, which displays a corresponding weight value G. When the object is placed on the movable bracket in an off-center position, the movable bracket may tilt to one side of the stationary bracket. The compression of the springs will not all be equal so as to produce an inconsistent displacement ΔS, and an erroneous weight value G is then generated.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
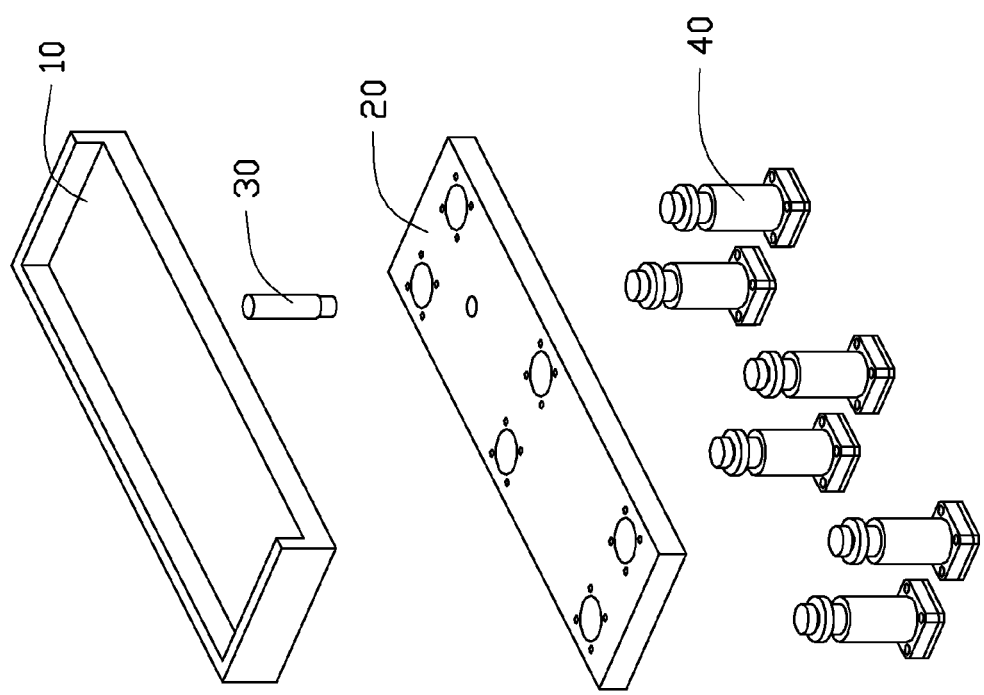
FIG. 1 is an exploded, isometric view of a first embodiment of a scale including a resilient mechanism.

Referring to FIG. 1, a first embodiment of a scale 100 includes a movable bracket 10, a stationary bracket 20, a linear displacement sensor 30 and a plurality of resilient mechanisms 40. The movable bracket 10 is disposed opposite to the stationary bracket 20. The linear displacement sensor 30 is disposed between the movable bracket 10 and the stationary bracket 20. The resilient mechanisms 40 are fixed between the movable bracket 10 and the stationary bracket 20.

In the illustrated embodiment, the linear displacement sensor 30, fixed to the stationary bracket 20, is an infrared linear displacement sensor, a laser linear displacement sensor, a capacitive linear displacement sensor, or other.

Figure 2:
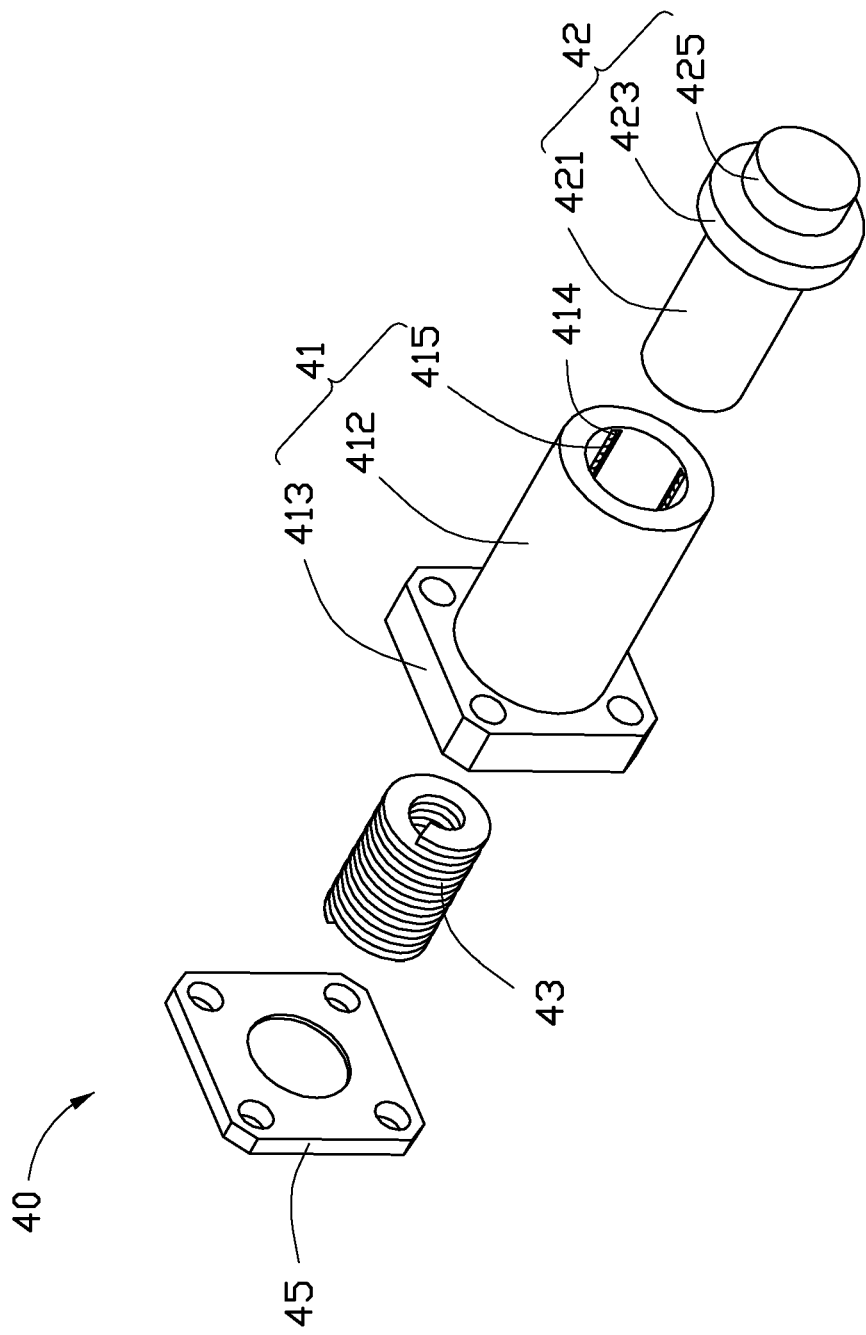
FIG. 2 is an enlarged, exploded, isometric view of the resilient mechanism shown in FIG. 1.
Figure 3:
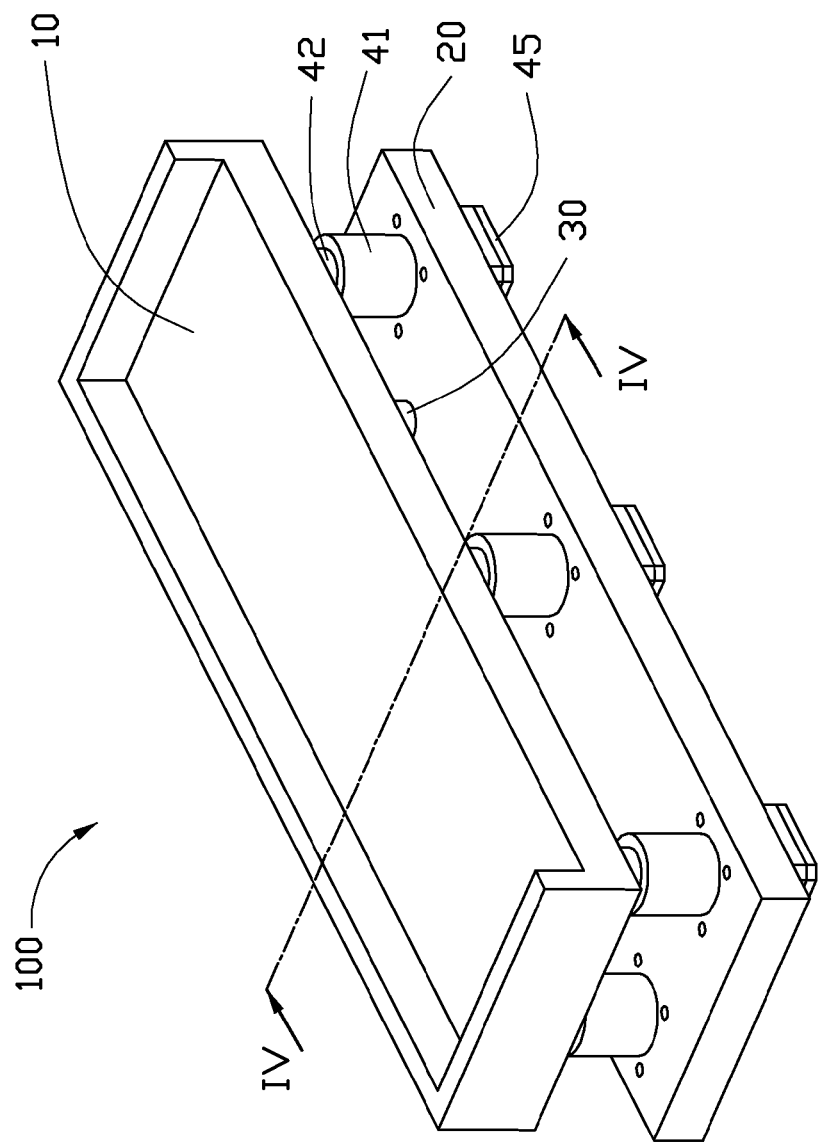
FIG. 3 is an assembled, isometric view of the scale shown in FIG. 1.
Figure 4:
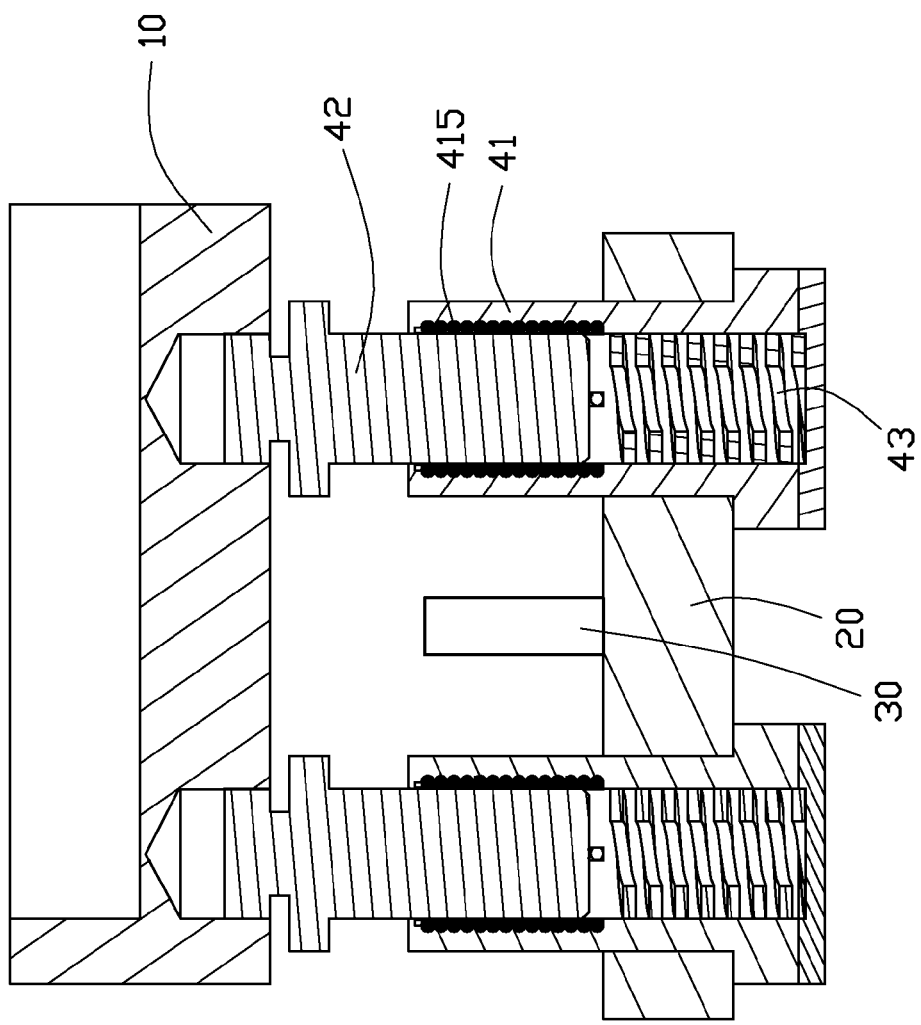
FIG. 4 is a cross-section taken along line IV-IV of FIG. 3.

Referring to FIGS. 2 through 4, each resilient mechanism 40 includes a sleeve 41, a limiting shaft 42, a resilient member 43 and a fixing member 45. The limiting shaft 42 is fixed to the movable bracket 10. The sleeve 41 is fixed to the stationary bracket 20, and sleeved on the limiting shaft 42. The resilient member 43 is received in the sleeve 41, and resists a free end of the limiting shaft 42. The fixing member 45 is fixed at an end of the sleeve 41.

The sleeve 41 includes a hollow cylindrical body 412, a fixing plate 413 and a plurality of ball bearings 415. The fixing plate 413 is fixed to an end of the cylindrical body 412. The ball bearings 415 are seated in two channels 414 defined in the inner wall of the cylindrical body 412.

The limiting shaft 42 includes a shaft portion 421, a resisting portion 423 and a fixing portion 425. The shaft portion 421 is slidably received in the sleeve 41. The ball bearings 415 can roll relative to the shaft portion 421, such that the friction therebetween is eased. The resisting portion 423 is arranged at a sidewall of the shaft portion 421 adjoining the fixing portion 425. The fixing portion 425 is fixed at an end of the shaft portion 421. The fixing portion 425 is threaded into the movable bracket 10.

The resilient member 43 is a substantially cylindrical compression spring with a diameter approximately equaling the inside diameter of the cylindrical body 412 of the sleeve 41. The fixing member 45 is fixed to a free end of the fixing plate 413 of the sleeve 41, such that the resilient member 43 is limited therein. The fixing member 45 is substantially the same shape as the fixing plate 413.

Referring to FIGS. 2 through 4 again, during assembly of the scale 100, the cylindrical body 412 of the sleeve 41 passes through the stationary bracket 20, and the sleeve 41 is fixed to the stationary bracket 20 by a fastener. The resilient member 43 is received in the sleeve 41. The fixing member 45 is fixed to the sleeve 41, such that the resilient member 43 is confined in the sleeve 41. The fixing portion 425 of the limiting shaft 42 is fixed to the movable bracket 10. The linear displacement sensor 30 is fixed to the stationary bracket 20. The movable bracket 10 is above the stationary bracket 20. The shaft portion 421 of the limiting shaft 42 is received in the sleeve 41.

When an object to be weighed is placed on the movable bracket 10 of the scale 100, the limiting shaft 42 is slidably fixed in the sleeve 41, and resists the resilient member 43, such that the resilient member 43 is compressed. The linear displacement sensor 30 registers a displacement ΔS of the movable bracket 10. The displacement ΔS equals the compression deformation of the resilient member 43 of the resilient mechanisms 40. F represents an elastic force of each resilient member 43. N represents the number of resilient members 43. Based on the principle of mechanical equilibrium, the weight value G of the member equals the total elastic force N×F of the resilient members 43, as expressed in the following:

$$G = N \times F \quad (1)$$

A deformation of each resilient member 43 conforms to Hooke's law, whereby the elastic force F is determined by the following formula:

$$F = K \times \Delta S \quad (2)$$

wherein K is a spring force constant/rigidity factor of the resilient members 43.

According to formulae (1) and (2), the weight value G is determined by the following:

$$G = N \times K \times \Delta S \quad (3)$$

therefore, the weight value G is generated by the displacement $\Delta S$.

The sleeves 41 receive the limiting shafts 42 to prevent the movable bracket 10 from tilting to one side of the stationary bracket 20, such that the compression deformations of the resilient members 43 are equal to one another. The resilient members 43 are received in the sleeves 41, such that the resilient members 43 are not deformed. Thus, the accuracy of the weight value G is increased. Furthermore, when the object is excessively heavy, the resisting portions 423 of the limiting shafts 42 resist the sleeves 41 such that the resilient member 43 is not overly deformed.

It is to be understood that the linear displacement sensor 30 can be fixed to the movable bracket 10. The resilient mechanisms 40 can be fixed to the movable bracket 10, with the limiting shaft 42 correspondingly fixed to the stationary bracket 20.

Figure 5:
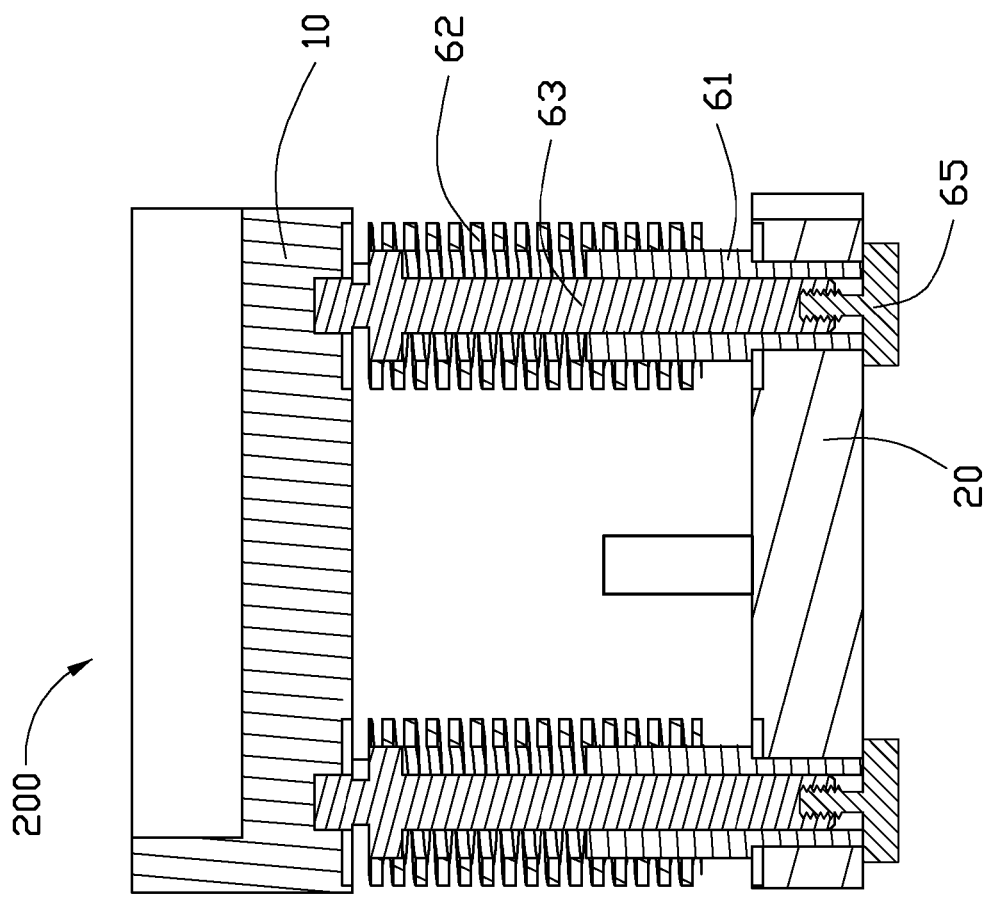
FIG. 5 is a cross-section, isometric view of a second embodiment of a scale including a plurality of resilient mechanisms.
Figure 6:
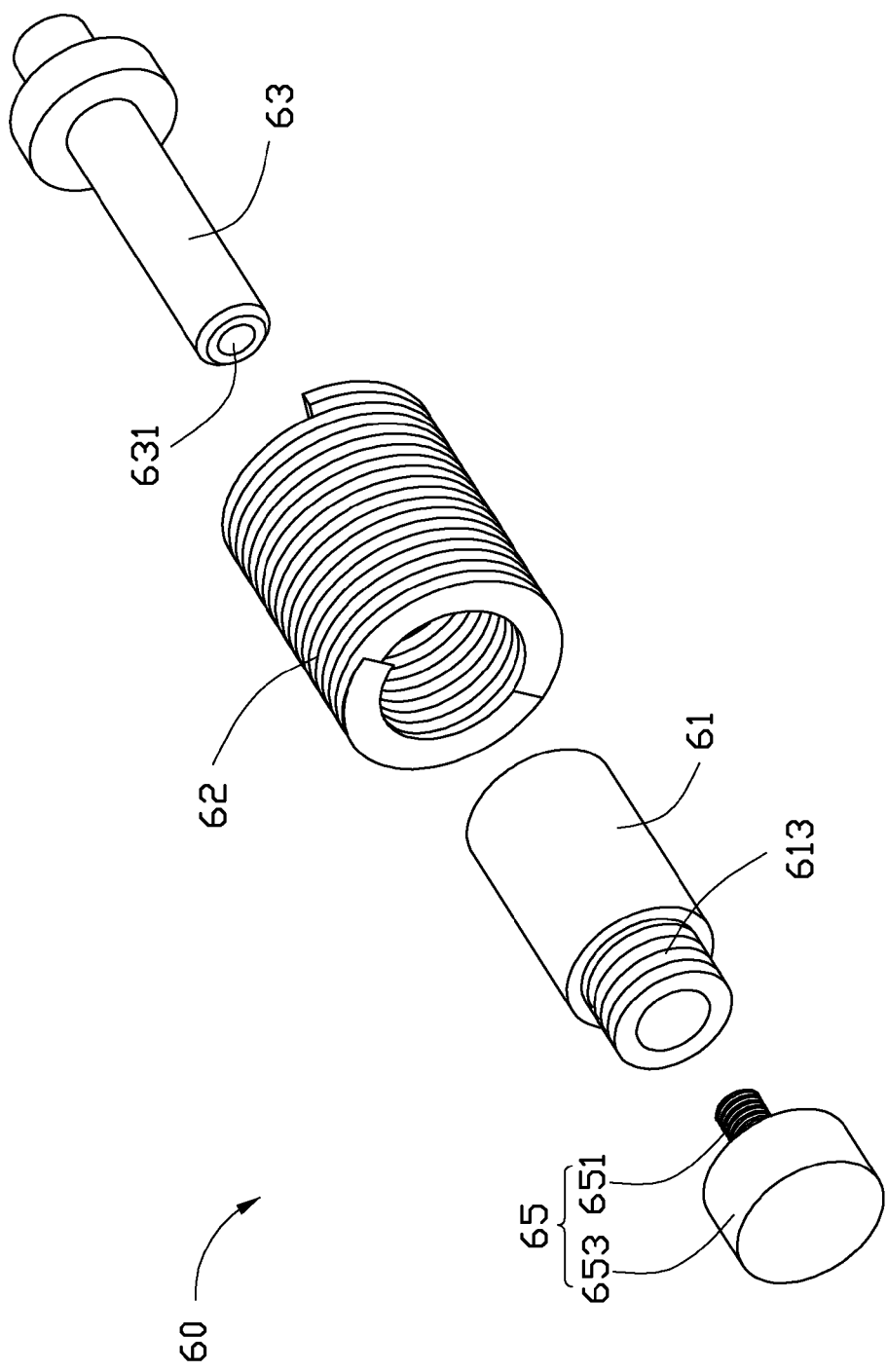
FIG. 6 is an exploded, isometric view of an alternative to the resilient mechanisms shown in FIG. 5.

Referring to FIGS. 5 and 6, a second embodiment of a scale 200 is shown, differing from the first embodiment only in that each resilient mechanism 60 includes a sleeve 61, a resilient member 62, a limiting shaft 63 and a fixing member 65. The sleeve 61 includes a threaded portion 613 on an end of the sleeve 61. The resilient member 62 is sleeved on the sleeve 61. The limiting shaft 63 defines a threaded hole 631 on an end surface thereof. The fixing member 65 includes a threaded post 651 and a resisting portion 653 disposed on an end thereof. The threaded post 651 is received in the threaded hole 631 to limit and prevent the limiting shaft 63 from separating the sleeve 61. When an object to be weighed is placed on the movable bracket 10 of the scale 200, the moveable bracket 10 is moved toward the stationary bracket 20. The movable bracket 10 compresses the resilient member 62, such that the resilient member 62 is deformed.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A scale comprising:
a stationary bracket;
a movable bracket disposed opposite to the stationary bracket;
a linear displacement sensor disposed between the stationary bracket and the movable bracket; and
a plurality of resilient mechanisms disposed between the stationary bracket and the movable bracket, wherein each resilient mechanism comprises a limiting shaft, a sleeve movably sleeved on the limiting shaft and a resilient member received in the sleeve, the limiting shaft is fixed to one of the stationary bracket and the movable bracket, the sleeve is fixed to the other of the stationary bracket and the movable bracket, the resilient member is elastically deformed by resisting a free end of the limiting shaft, the linear displacement sensor registers a displacement of the movable bracket, and the limiting shaft comprises a shaft portion and a resisting portion arranged at a sidewall of the shaft portion, the resisting portion resists the sleeve.

2. The scale of claim 1, wherein the sleeve comprises a cylindrical body, a fixing plate fixed to an end of the cylindrical body and a plurality of the ball bearings received in an inner wall of the cylindrical body.

3. The scale of claim 2, further comprising a fixing member fixed to the fixing plate, the fixing member limiting the resilient member in the sleeve.

4. The scale of claim 2, wherein the cylindrical body defines two channels in the inner wall thereof to receive the ball bearings.

5. The scale of claim 1, wherein the limiting shaft further comprises a fixing portion fixed to an end of the shaft portion.

6. The scale of claim 1, wherein the resilient member is a substantially cylindrical compression spring.

7. The scale of claim 1, wherein the linear displacement sensor is an infrared linear displacement sensor, a laser linear displacement sensor or a capacitive linear displacement sensor.

8. A scale comprising:
a stationary bracket;
a movable bracket disposed opposite to the stationary bracket;
a linear displacement sensor disposed between the stationary bracket and the movable bracket; and
a plurality of resilient mechanisms disposed between the stationary bracket and the movable bracket, wherein each resilient mechanism comprises a limiting shaft, a sleeve movably sleeved on the limiting shaft and a resilient member sleeved on the sleeve, the limiting shaft is fixed to one of the stationary bracket and the movable bracket, the sleeve is fixed to the other of the stationary bracket and the movable bracket, the resilient member is elastically deformed by resisting the movable bracket, and the linear displacement sensor registers a displacement of the movable bracket.

9. The scale of claim 8, wherein the sleeve comprises a threaded portion on an end thereof fastened to the stationary bracket.

10. The scale of claim 8, further comprising a fixing member fixed to the limiting shaft.

11. The scale of claim 10, wherein the fixing member comprises a threaded post and a resisting portion disposed on an end thereof, the limiting shaft defining a threaded hole on an end surface thereof and the threaded post received in the threaded hole to limit the limiting shaft.

12. The scale of claim 8, wherein the limiting shaft comprises a shaft portion and a resisting portion arranged at a sidewall of the shaft portion, the resisting portion resists the sleeve.

13. The scale of claim 8, wherein the resilient member is a substantially cylindrical compression spring.

14. The scale of claim 8, wherein the linear displacement sensor is an infrared linear displacement sensor, a laser linear displacement sensor or a capacitive linear displacement sensor.

* * * * *